United States Patent [19]

Fernandez

[11] Patent Number: 5,706,616
[45] Date of Patent: Jan. 13, 1998

[54] SYSTEM AND APPARATUSSES TO OPERATE A TRANSPORTABLE CINEMA ROOM

[76] Inventor: Hector Raul Lopez Fernandez, AV. Chapultepec 444, D.F., Mexico, 06140

[21] Appl. No.: 497,749

[22] Filed: Jul. 3, 1995

[30] Foreign Application Priority Data

Oct. 27, 1994 [MX] Mexico ................... 84 82 96

[51] Int. Cl.⁶ ..................................... B60P 3/00
[52] U.S. Cl. .................... 52/143; 52/67; 52/79.5; 296/24.1; 296/26
[58] Field of Search ............ 296/26, 24.1; 52/67, 52/143, 79.5

[56] References Cited

U.S. PATENT DOCUMENTS

| | | | |
|---|---|---|---|
| 776,623 | 12/1904 | Smith | 296/24.1 |
| 1,355,408 | 10/1920 | Moody | 296/24.1 |
| 2,704,223 | 3/1955 | Houdart | 296/26 |
| 3,719,386 | 3/1973 | Puckett et al. | 296/26 |
| 4,377,367 | 3/1983 | Smith | 296/24.1 X |
| 4,449,746 | 5/1984 | Clark | 296/24.1 X |
| 4,480,866 | 11/1984 | Komatsu | 296/26 X |
| 4,538,995 | 9/1985 | Fryer | 296/24.1 X |
| 4,666,204 | 5/1987 | Reinholtz | 296/24.1 |
| 4,771,305 | 9/1988 | Potoroka | 296/24.1 X |
| 4,869,030 | 9/1989 | Clark | 52/67 X |
| 4,883,306 | 11/1989 | Stucky | 52/143 X |
| 4,900,217 | 2/1990 | Nelson | 296/26 X |
| 4,958,874 | 9/1990 | Hegedus | 296/26 |
| 4,964,671 | 10/1990 | Millar | 296/24.1 X |
| 5,061,001 | 10/1991 | Madden et al. | 296/26 |
| 5,170,901 | 12/1992 | Bersani | 52/67 X |
| 5,173,052 | 12/1992 | Duncan, Jr. | 296/24.1 X |
| 5,197,774 | 3/1993 | Diaz | 296/24.1 |
| 5,285,604 | 2/1994 | Carlin | 52/143 X |
| 5,291,701 | 3/1994 | Delacollette et al. | 296/26 X |
| 5,375,899 | 12/1994 | Wright | 296/26 X |
| 5,398,986 | 3/1995 | Koob | 296/24.1 |

FOREIGN PATENT DOCUMENTS

| | | | |
|---|---|---|---|
| 665853 | 7/1963 | Canada | 52/67 |
| 2058548 | 6/1993 | Canada | 296/24.1 |
| 278626 | 8/1988 | European Pat. Off. | 296/24.1 |
| 172836 | 10/1982 | Japan | 296/24.1 |
| 60-183236 | 9/1985 | Japan | 296/24.1 |
| 61-244635 | 10/1986 | Japan | 296/26 |
| 1-240334 | 9/1989 | Japan | 296/24.1 |
| WO87/07665 | 12/1987 | WIPO | 296/24.1 |
| WO90/08861 | 8/1990 | WIPO | 52/67 |

*Primary Examiner*—Wynn E. Wood
*Assistant Examiner*—Laura A. Saladino
*Attorney, Agent, or Firm*—Jacobson, Price, Holman & Stern, PLLC

[57] ABSTRACT

A system for operating a transportable cinema room including a truck for carrying a trailer or body, hydropneumatic pistons with sufficient support to convert such body into a projection cinematographic room incorporating enough seats for a number of attending spectators, a candy shop with an electronic device to dispense different kinds of food or similar products, men and women toilet rooms, an illuminated marquee with collapsible sign, both illuminated access stairs and handrails which are also collapsible, independent air conditioner, distributing water reservoir for the toilet rooms, easily operated film projector, collapsible projection screen with adaptable outside viewers, a demountable electric power plant, a water hydropneumatic pumping, an emergency exit accommodation ramp including handrails and a ticket office with an electronic ticket dispatcher.

3 Claims, 5 Drawing Sheets

SYSTEM AND APPARATUSSES TO OPERATE A TRANSPORTABLE CINEMA ROOM

PRIOR ART

Since the first cinema room for movie projection, there has been a growing need for greater accommodation space in various regions. In addition, audience comfort and movie related commerce areas have been important to allow audiences to buy all kinds of candies, chocolates, sodas and fast food assortments. Also adequate sanitary facilities have been required. It has been always the basic goal to achieve these goals, so as to provide motivation for economic resources to be invested to acquire the land space for building so as to successfully build movie houses. Consequently the above-mentioned rooms or auditoriums are usually located in big cities or in small towns when investors can afford the referred to investments.

SUMMARY OF THE INVENTION

It is the main object of the present invention to provide a transportable cinema room or auditorium which may be transported and temporarily installed in areas where no cinema buildings can be found or simply where provisional auditoriums or movie projection rooms are necessary, avoiding the huge investments required by permanent installations.

It is another object of the invention to have an on-wheels auditorium for basically movie projection with the appropriate capacity and required operation and comfort means able to permit the access of an audience of a size similar to small ground building auditoriums.

It is a further object of the invention to provide a transportable or road passable cinema room dedicated to cultural or commercially remote areas with no auditorium facilities, for the exhibition of movies or similar purposes.

It is still another object of the present invention to install on a road passable basis, a complete cinema room including entrance and exit means, bathrooms, ticket expending devices, air control systems and outside viewing areas for extra audiences not able to fit inside of the above-mentioned cinema room, when the operator decides to.

These and other objects of the invention will be apparent to those skilled in the art from the reading of the following specification.

DETAILED DESCRIPTION OF THE PREFERRED EMBODIMENTS

Figure 1:
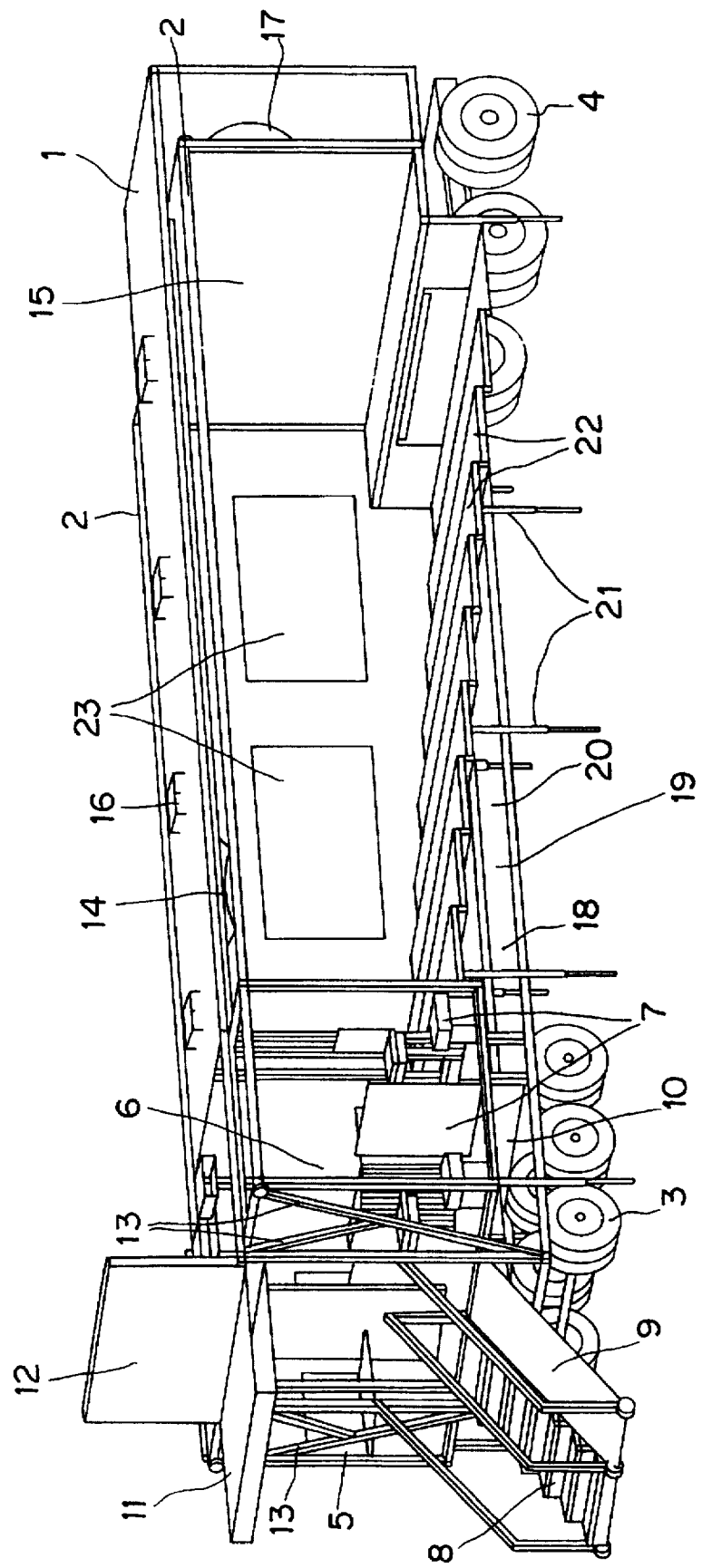
FIG. 1 is a perspective view of the present invention with its open and extended non-movable and collapsible means through a no walls illustrated lateral view.

The stationary part of the invention constitutes the basic structure of the trailer building and supports the movable and slidable outward moving parts (2) giving the necessary space to extend and accommodate the projection room and the bathrooms, candy shop and tickets dispatcher.

Station wagon tires (3) are used in the front of the trailer to allow enlargement of the inner space of the trailer, taking profit of trailer tires (4) to movably support the back of the mentioned basic structure. The inner portion of the referred to structure includes, as previously widely referred to, a ticket office (5) with a left external window including an electronic ticket dispatcher at an inner window, to control the incoming audience to the inside of the room; a candy shop (6) with an external view (at the side of the ticket office) window and with a products electronic dispenser; bathrooms for men and women (7); collapsible stairs (8) with safety rails; a fast emergency exit ramp (9) also with safety rails; a storage compartment (10) for the stairs and the collapsible ramp; a collapsible marquee (11) at the back side of the trailer including external and internal lighting means to illuminate the access stairs; show billboard located inside of the marquee with lighting to exhibit billboards at an inside portion so as to be protected from outdoors weather; hydro-pneumatic stroke piston systems (13) are used to project the movable part of the transportable cinema room; a film projector (14) is controlled by the operator of the ticket office from their inside position; a projection screen (15) is collapsible together with the movable parts of the trailer including both axles at the stationary sides of each one of the mentioned movable parts of the trailer; air conditioning system (16) controlled from the inside of the ticket office; water tank (17) to feed the bathrooms; electric plant (18) dismountable from the floor; and hydropneumatic pump (19); a water pump (20); an hydropneumatic piston (21) urging down from the movable parts once they start to open and supporting the same with wheels coming also down to the floor; seats or armchairs (22) and finally incorporating outside view screens 23.

Other features of the invention will be described for the better comprehension of the invention.

Figure 2:
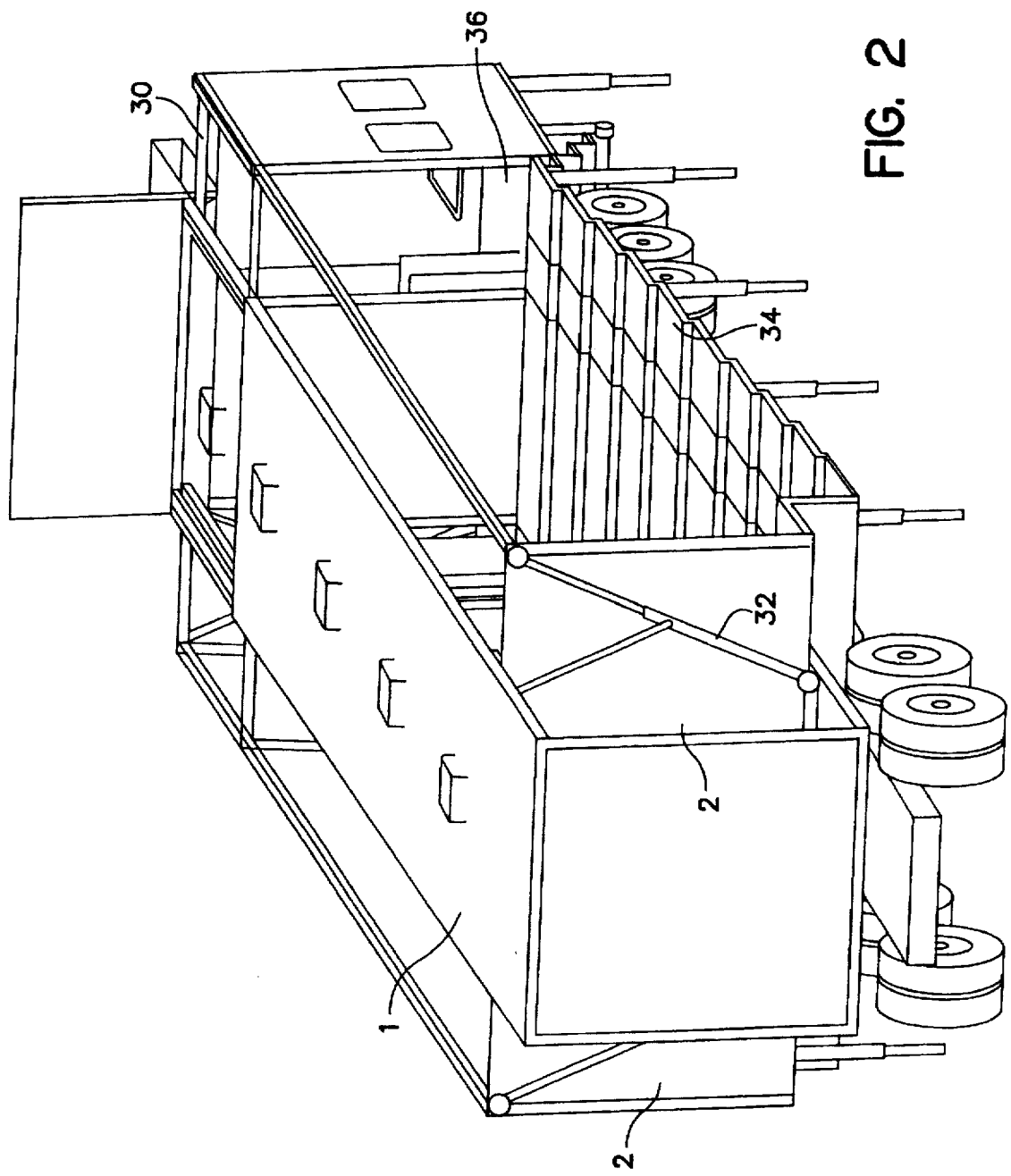
FIG. 2 shows a back perspective view of the invention principally illustrating outward movement of the corresponding parts.

It can be also seen, in FIG. 2, the axle (30) over which extend the outwardly extending pistons of the movable parts (2); a back system of hydropneumatic pistons (32) (FIG. 2), for the also outward extension of the movable parts (2) of the invention; the floor (34) of the cinema room is one of the movable parts while the floor (36) of the bathrooms, candy shop and ticket office, are straight and stationary, as is also shown in FIG. 2.

Figure 3:
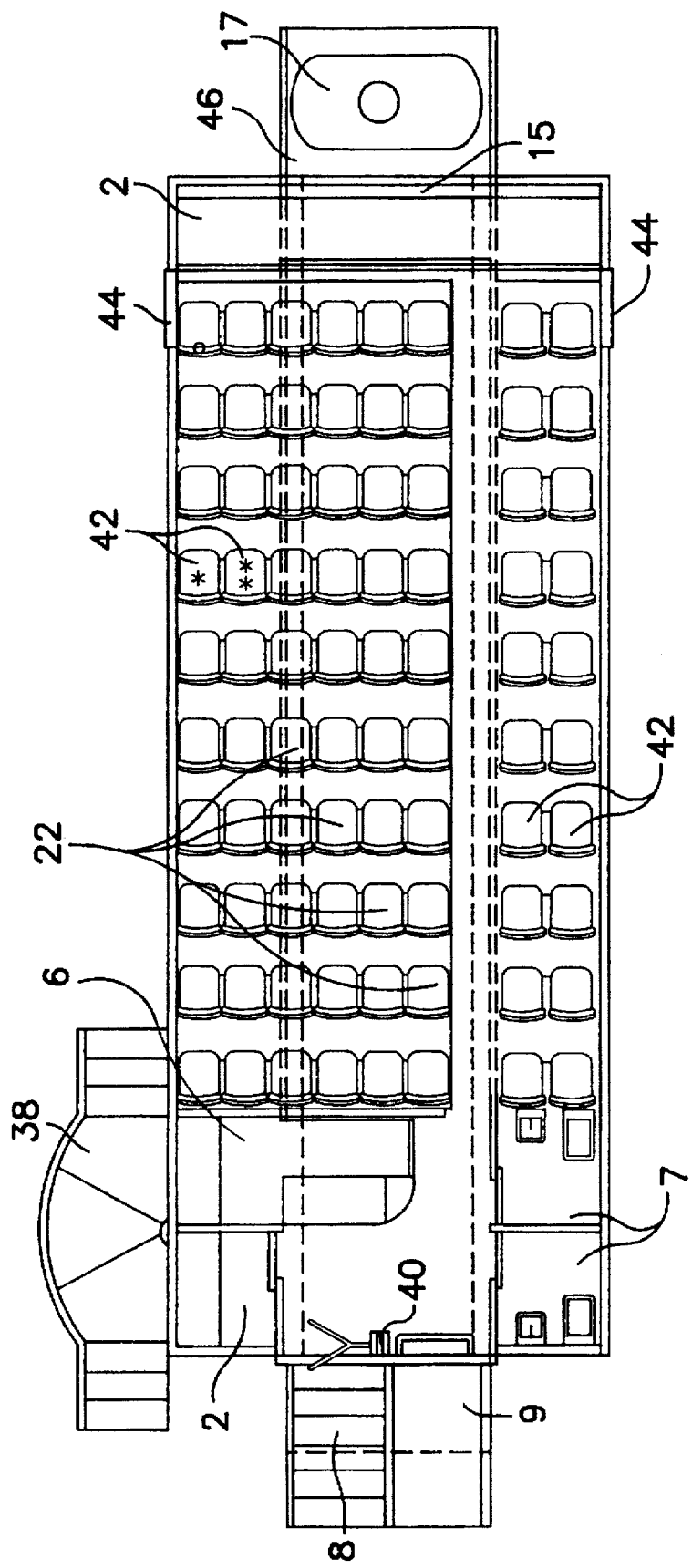
FIG. 3 illustrates a plan view of the invention without the roof shown to appreciate the space proportions and elements constituting said invention.

The fan shaped collapsible stair (38) (FIG. 3), is kept under the floor (36) and is useful to get access to the ticket office window and the external window of the candy shop. It is also possible, from the ticket office, to electronically dispense the ticket and control the operation of the transportable cinema. Similarly, upper sights appear related with the entrance stairs (8) (FIG. 3), collapsible under the floor of the invention while the automatic audience quantity counter (40) (FIG. 3) is controlled by the ticket office operator. The candy shop (6) is used to sell candy inside and outside of the trailer. The bathrooms (7) (FIG. 3) are attached to the floor of the stationary part of the transportable cinema. Seats (22) (FIG. 3) are attached to the floor on the stationary part of the invention. Floor dismountable seats (42) (FIG. 3) of the movable parts (2) of the invention are stacked over the stationary seats (22) when the transportable cinema is being moved. Emergency exits (44) (FIG. 3) are also useful to exit the cinema room once each show is over. Fast emergency exit ramp (9) (FIG. 3), projection screen (15) (FIG. 3), water tank (17) (FIG. 3), movable parts (2) (FIG. 3), and basic or stationary part (46) (FIG. 3) are additional parts of the transportable cinema.

Figure 4:
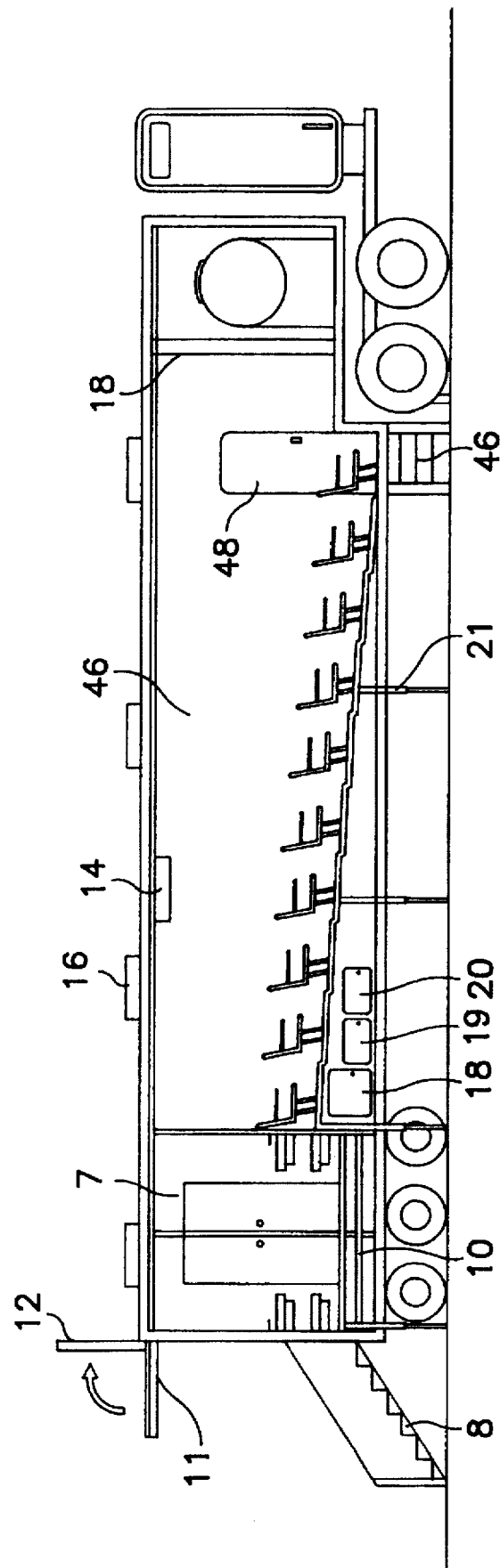
FIG. 4 shows a lateral view section of the road passable cinema illustrating the corresponding heights and elevations for other elements of said cinema.

Through a lateral sectional view, it is possible to see the height and bottom levels of the trailer incorporating the other elements of the trailer. An external noise wall isolator is present in the cinema room (46) (FIG. 4), as well as inside and outside film projector (14) (FIG. 4), independent air conditioning system (16) (FIG. 4), automatically controlled by the ticket office operator, bathrooms (7) (FIG. 4), an illuminated up and down collapsible marquee (11) (FIG. 4), bill board (12) (FIG. 4) collapsible from the inside of the marquee, access stairs (8) (FIG. 4), and a fast emergency exit ramp, with handrails, collapsible on both sides and elevatable to be kept under the transportable cinema (46), storage box (10) (FIG. 4) for the stairs and exit emergency ramp module, dismountable electric plant (18) (FIG. 4), hydropneumatic (19) (FIG. 4), and water (20) pump, an hydropneumatic piston (21) (FIG. 4), supporting the movable part (2) of the invention which is lowered when the movable part initiates its coming out and stops so that the piston comes totally down to the floor. Once in that position, the piston is totally lowered, and the movable parts (2) keep coming out up to their limit.

It can be also appreciated, when viewing the trailer, a projection screen (15) (FIG. 4), an emergency exit stairs (46) (FIG. 4) and an emergency door (48) (FIG. 4) operable exclusively from the inside of the cinema room are seen. Further, in a back sectional view the trailer illustrated in its extended form shows the movable parts at the sides and the central stationary part so as to position the pistons supporting the movable parts. The basic or stationary part (50) of the trailer (FIG. 5), the movable part (2) (FIG. 5) shown at the side of the basic or stationary part (50), collapsible, fan shaped, platform stair (38) (FIG. 5), to have access to the ticket office and to the back portion of the external dispensing portion of the candy shop are all shown in FIG. 5.

Figure 5:
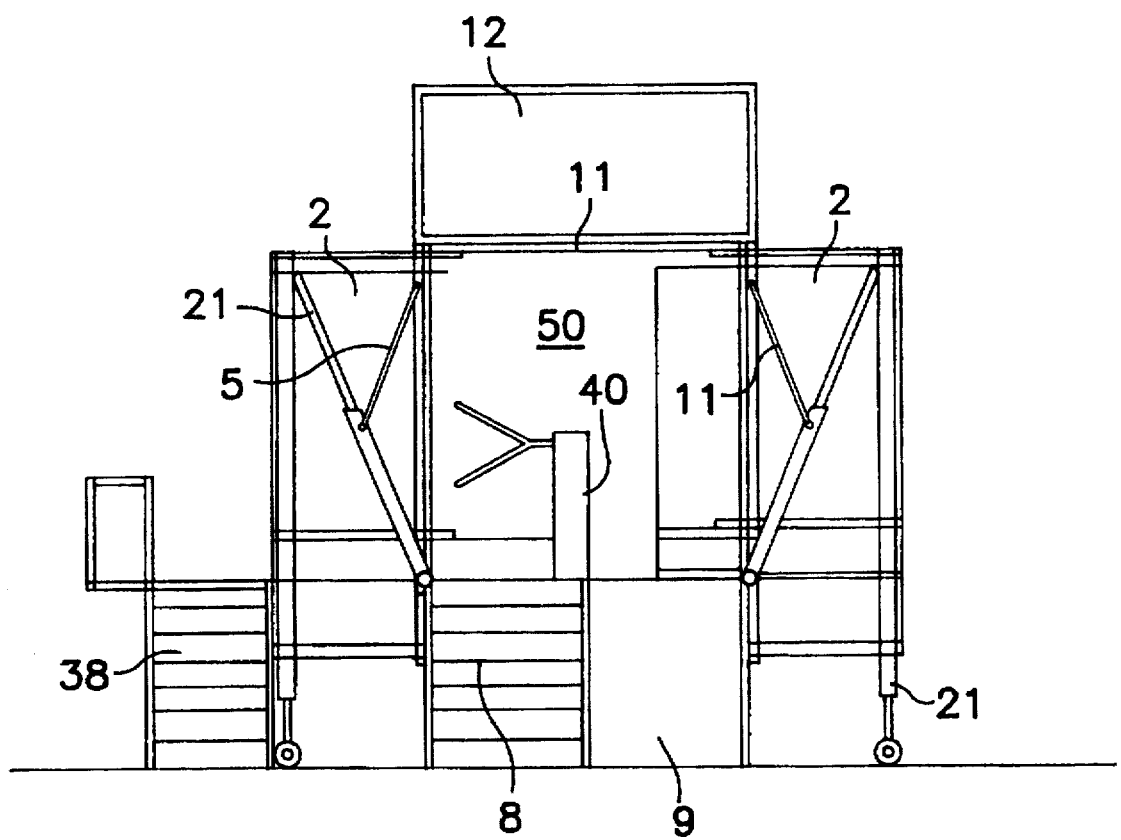
FIG. 5 shows a back section view of the invention in its extended form to show the side movable parts and the central stationary parts and the position of the pistons supporting the movable parts.

In addition, ticket office (5), access stair (8), the access control bar (40), entrance to the projection room, collapsible illuminated marquee (11), collapsible exit emergency ramp (9), and the wheeled hydropneumatic piston (21) supporting the movable parts (2) all relate to the trailer of the invention, and are illustrated in FIG. 5.

I claim:

1. A transportable cinema room and system to operate the cinema room comprising a trailer having a stationary part and two movable parts, slidable laterally away from the stationary part in opposite directions, seats fixed to the stationary part of the trailer, hydropneumatic pistons supporting the two movable parts, and having enough seats stacked in the stationary part above the fixed seats and movable to the movable parts for seating a number of attending spectators in the movable parts, a ticket office in the stationary part of the trailer at one end of the trailer, said ticket office including an electronic ticket dispenser, a candy shop in the stationary part of the trailer located at the one end of the trailer with electronic means for dispensing different kinds of products inside and outside of the trailer, men and women toilet rooms in the stationary part of the trailer located at the one end of the trailer, an illuminated marquee located above the ticket office at the one end of the trailer, a collapsible billboard located at the one end of the trailer for displaying a title of a movie being shown, illuminated access stairs and handrails to the one end of the trailer with collapsible means for storing the stairs and handrails in a compartment below a floor of the trailer, means for air conditioning located in the trailer and controlled from the ticket office, a distributing water reservoir in the trailer for the toilet rooms, a film projector in the trailer and controlled from the ticket office, a collapsible projection screen mounted at the other end of the trailer from the one end, a demountable electric power plant in the trailer, a water hydropneumatic pumping means in the trailer, an emergency exit ramp including handrails located next to said access stairs at the one end of the trailer, and a stair assembly located on a side of the trailer at the one end of the trailer to access the ticket office through a window in a side wall in the trailer and to access the candy shop through another window in the side wall of the trailer.

2. A transportable cinema room as claimed in claim 1, wherein an automatic audience quantity counter is located at the one end of the trailer adjacent to the access stairs.

3. A transportable cinema room as claimed in claim 2, wherein the quantity counter is controlled from the ticket office.

* * * * *